United States Patent
Kornfeld et al.

(10) Patent No.: US 10,318,426 B1
(45) Date of Patent: Jun. 11, 2019

(54) CLOUD CAPABLE STORAGE PLATFORM WITH COMPUTATION OPERATING ENVIRONMENT FOR STORAGE AND GENERIC APPLICATIONS

(75) Inventors: Sergey Kornfeld, Waltham, MA (US); Lev Knopov, Brookline, MA (US); Alexandr Veprinsky, Brookline, MA (US); John T. Fitzgerald, Mansfield, MA (US); Balakrishnan Ganeshan, Foster City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1174 days.

(21) Appl. No.: 13/245,962

(22) Filed: Sep. 27, 2011

(51) Int. Cl.
| | |
|---|---|
| *G06F 12/08* | (2016.01) |
| *G06F 3/06* | (2006.01) |
| *G06F 9/50* | (2006.01) |
| *G06F 12/084* | (2016.01) |
| *G06F 12/0866* | (2016.01) |

(52) U.S. Cl.
CPC .......... *G06F 12/084* (2013.01); *G06F 3/067* (2013.01); *G06F 3/0689* (2013.01); *G06F 9/5077* (2013.01); *G06F 12/0866* (2013.01)

(58) Field of Classification Search
CPC .. G06F 17/30067; G06F 3/067; G06F 3/0689; G06F 12/0866; G06F 12/084; G06F 9/5077
See application file for complete search history.

(56) References Cited

U.S. PATENT DOCUMENTS

| | | | | |
|---|---|---|---|---|
| 6,324,623 | B1 * | 11/2001 | Carey ................... | G06F 12/084 711/137 |
| 6,665,740 | B1 * | 12/2003 | Mason, Jr. ........... | G11B 27/002 348/E5.008 |
| 6,721,870 | B1 * | 4/2004 | Yochai ................. | G06F 3/0611 711/112 |
| 6,813,676 | B1 * | 11/2004 | Henry ................. | G06F 13/4022 370/396 |
| 6,854,034 | B1 * | 2/2005 | Kitamura ............. | G06F 3/0605 707/999.202 |
| 6,907,457 | B2 * | 6/2005 | Merrell et al. ................ 709/223 |

(Continued)

OTHER PUBLICATIONS

Chi, C.-H.; Dietz, H., "Improving cache performance by selective cache bypass," System Sciences, 1989. vol. I: Architecture Track, Proceedings of the Twenty-Second Annual Hawaii International Conference on , vol. 1, No., pp. 277,285 vol. 1, Jan. 3-6, 1989.*

(Continued)

*Primary Examiner* — Ramon A. Mercado
(74) *Attorney, Agent, or Firm* — Anderson Gorecki LLP (57) ABSTRACT

A storage cloud enabled platform includes storage nodes and application nodes which are the part of the same operating environment. The storage nodes and computation nodes are interconnected inside platform via an interface to provide improved response time and high bandwidth paths for storage applications. The computation nodes may include virtual or non-virtual machines. The interface may support various protocols depending on desired ease of use and response time. For example, a standardized protocol such as SCSI could be used for ease of use and data safety, or a direct data placement protocol could be used to help maximize response rate.

24 Claims, 7 Drawing Sheets

Storage Platform 200

(56) References Cited

U.S. PATENT DOCUMENTS

| | | | | |
|---|---|---|---|---|
| 6,952,737 | B1* | 10/2005 | Coates | G06F 3/0607 707/E17.01 |
| 7,032,228 | B1* | 4/2006 | McGillis | G06F 3/0607 709/217 |
| 7,181,578 | B1* | 2/2007 | Guha | G06F 3/0607 711/154 |
| 7,233,984 | B2* | 6/2007 | Mohamed et al. | 709/220 |
| 7,266,622 | B2* | 9/2007 | Flanigan | G06F 17/3048 707/999.001 |
| 7,330,862 | B1* | 2/2008 | Srinivasan | G06F 12/0866 |
| 7,480,780 | B2* | 1/2009 | Kitamura | G06F 3/0605 711/154 |
| 7,627,537 | B2* | 12/2009 | Lai | G06N 7/005 706/12 |
| 7,660,322 | B2* | 2/2010 | Kiel | H04L 49/102 370/413 |
| 7,873,619 | B1* | 1/2011 | Faibish et al. | 707/705 |
| 8,224,934 | B1* | 7/2012 | Dongre | H04L 63/102 709/221 |
| 8,443,141 | B2* | 5/2013 | Beardsley et al. | 711/113 |
| 8,627,012 | B1* | 1/2014 | Derbeko et al. | 711/135 |
| 2004/0078517 | A1* | 4/2004 | Kaneko | G06F 3/0611 711/113 |
| 2004/0268347 | A1* | 12/2004 | Knauerhase | G06F 9/45533 718/1 |
| 2005/0251631 | A1* | 11/2005 | Rowlands | G06F 12/084 711/145 |
| 2006/0212669 | A1* | 9/2006 | Uchida | G06F 11/2069 711/162 |
| 2006/0248285 | A1* | 11/2006 | Petev | G06F 12/084 711/141 |
| 2007/0192475 | A1* | 8/2007 | Das | G06F 11/2023 709/223 |
| 2007/0248029 | A1* | 10/2007 | Merkey et al. | 370/255 |
| 2008/0034417 | A1* | 2/2008 | He | H04L 67/02 726/15 |
| 2009/0006739 | A1* | 1/2009 | Lubbers | G06F 3/0613 711/114 |
| 2009/0182953 | A1* | 7/2009 | Merkey et al. | 711/136 |
| 2010/0198972 | A1* | 8/2010 | Umbehocker | G06F 3/0604 709/226 |
| 2010/0199036 | A1* | 8/2010 | Siewert | G06F 3/0613 711/112 |
| 2011/0320661 | A1* | 12/2011 | Heller | G06F 9/30087 710/200 |
| 2012/0079187 | A1* | 3/2012 | Beardsley et al. | 711/113 |
| 2012/0159067 | A1* | 6/2012 | Kelton et al. | 711/113 |

OTHER PUBLICATIONS

Shah, Pinkerton, et al., "Direct data placement over reliable transports", Oct. 2007.*

Mendel Rosenblum and Tal Garfinkel. 2005. Virtual Machine Monitors: Current Technology and Future Trends. Computer 38, 5 (May 2005), 39-47.*

Hypertransport Consortium. Hypertransport I/O Technology Comparison with Traditional and Emerging I/O Technologies. White Paper, Jun. 2004.*

Khalil Amiri, David Petrou, Gregory R. Ganger, and Garth A. Gibson. 2000. Dynamic function placement for data-intensive cluster computing. In Proceedings of the annual conference on USENIX Annual Technical Conference (ATEC '00). USENIX Association, Berkeley, CA, USA, 25-25.*

HyperTransport Technology Consortium, HyperTransport™ I/O Link Specification Revision 3.00b, 2007 (Year: 2007).*

* cited by examiner

CLOUD CAPABLE STORAGE PLATFORM WITH COMPUTATION OPERATING ENVIRONMENT FOR STORAGE AND GENERIC APPLICATIONS

CROSS-REFERENCE TO RELATED APPLICATIONS

N/A

FIELD OF THE INVENTION

This invention is generally related to data storage, and more particularly to networked storage systems.

BACKGROUND OF THE INVENTION

Figure 1:
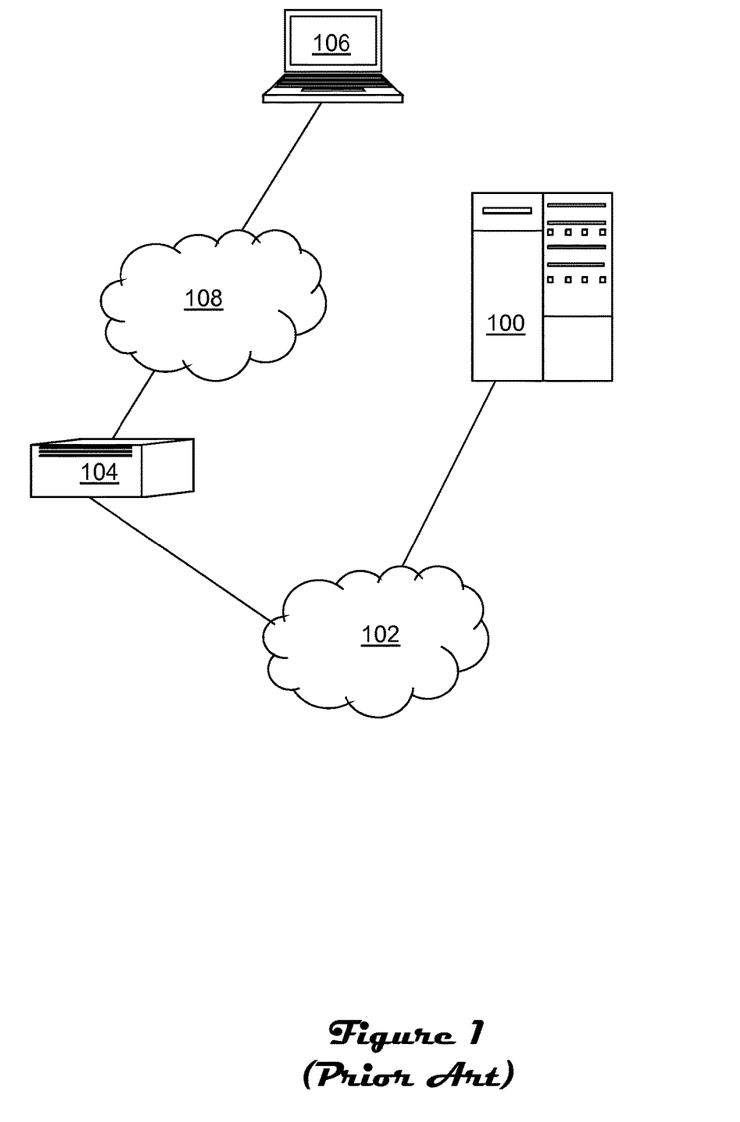
FIG. 1 illustrates a network in which a networked storage platform supports a host device that runs applications to support users.

Referring to FIG. 1, a networked storage platform 100, such as an EMC Symmetrix® Storage Array, can be used by an enterprise or other organization to maintain and protect large amounts of data which can be accessed via a communications network 102. The storage array includes at least one standardized network interface to support IO operations via the network 102. For example, the interface may support a storage protocol such as SCSI or NFS over a network protocol such as Fibre Channel (FC), Ethernet, or Infiniband. Data may be stored in various tiers of storage, each associated with various different physical storage devices, groups of which may have different performance characteristics. Redundant copies of data may be maintained within the storage array, and the storage array may be mirrored by another storage array. Various other features which are known in the art distinguish a typical network storage platform from other storage devices.

The operations performed within the storage platform to support data maintenance, protection and IOs are hidden from other devices. From the perspective of a host device 104, such as a server, an IO appears to be a local operation because, e.g., a SCSI command that would be used to access local storage is encapsulated, sent to the storage platform, de-encapsulated, and processed. The host is unaware, for example, of where the data is stored by the storage platform, or how the data is protected. However, the handling of data by the storage platform can affect performance of the host. In the example of an Internet transaction a user 106 initiates the transaction by communicating with the host device 104. The host device operates instances of applications created to support particular types of transactions. Operation of the applications may require access to data maintained by the storage platform 100. Consequently, IO operations take place between the host device and the storage platform in support of the application which is operated to support the transaction initiated by the user. If these IO operations include retrieval of data from relatively slow storage tier then latency increases. Furthermore, some latency can be expected from the network.

SUMMARY OF THE INVENTION

In accordance with an embodiment of the present invention, an apparatus comprises: a storage grid including a channel director which retrieves data from a cache in response to a storage protocol request, and a disk director that copies requested data from data storage to the cache; at least one computation node that runs an application; and an interface that enables communication between the storage grid and the computation node for data access in support of the application.

In accordance with another embodiment of the present invention, a method comprises: in a storage platform including a computation node and a storage grid including a channel director which retrieves data from a cache in response to a storage protocol request, and a disk director that copies requested data from data storage to the cache, running an application on the computation node, maintaining data by the storage grid, and exchanging data access communications between the storage grid and the computation node for data access in support of running the application.

An advantage associated with at least one aspect of the invention is that the latency associated with IO operations performed over a network is mitigated. In a typical prior art system a host device runs an application and a separate storage platform maintains data. IO operations in support of the application are performed over a network which interconnects the host with the storage platform. Integrating computation resources with a storage array helps to avoid the latency attributable to network operations. Furthermore, the networked storage platform may even obviate the need for servers and other host devices in certain situations. Even greater performance improvement may be obtained if the computation nodes directly communicate with one or more of the cache, disk director and LUNs using a direct data placement protocol.

These and other advantages of the invention will be more apparent from the detailed description and the drawing.

DETAILED DESCRIPTION

Various aspects of the invention may be implemented partially or completely using computer program code. The computer program code is stored on non-transitory computer-readable memory and utilized by processing hardware. The program code may be provided as a computer program product or be integrated into network equipment.

Figure 2:
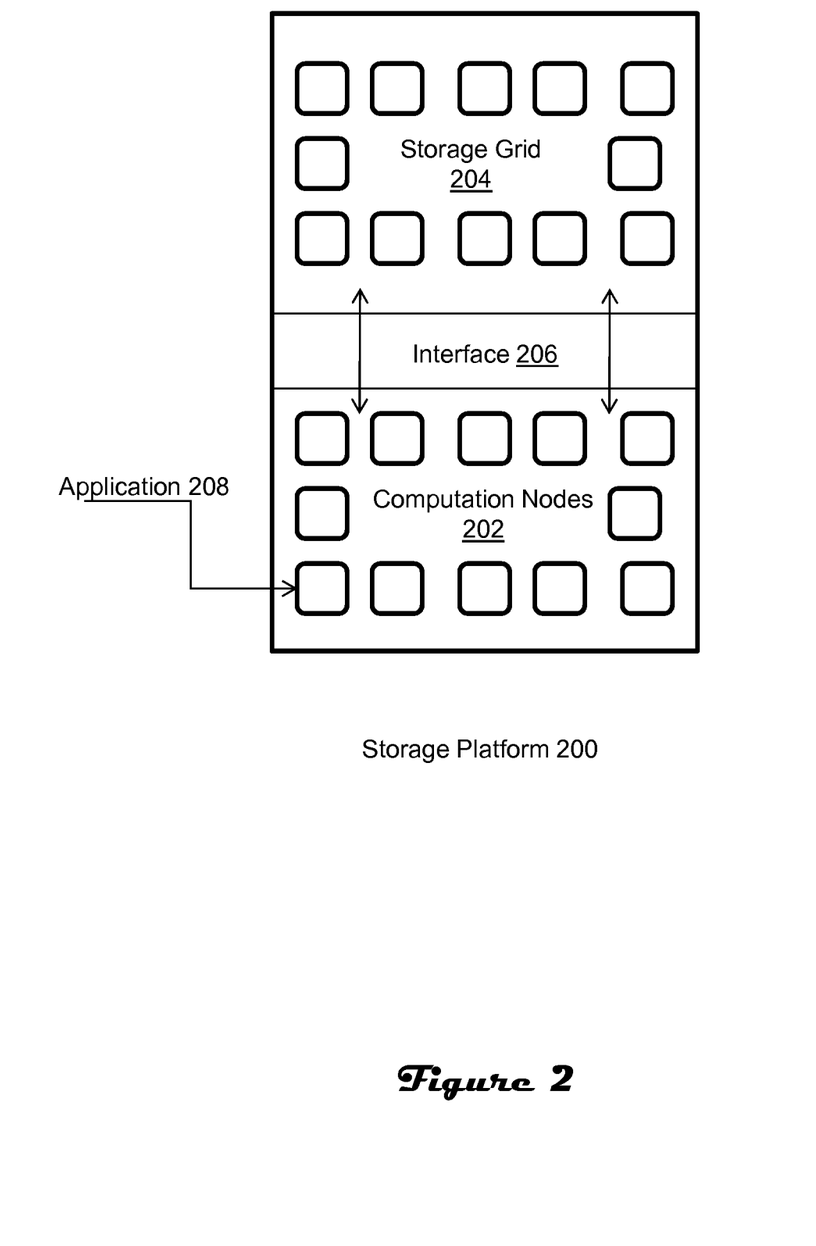
FIG. 2 illustrates a networked storage platform which includes computation nodes that run applications which utilize a storage grid.

FIG. 2 illustrates a networked storage platform 200 which includes a storage grid 204 and computation nodes 202. The storage grid is operative to maintain and protect data, e.g., data that is utilized by applications including but not limited to applications run by the computation nodes. Each computation node is operative to run one or more applications 208 which are selected and loaded by a subscriber or owner/operator of the storage platform. The applications may also be removed by the subscriber or owner/operator, e.g., for replacement with other applications. An interface 206 allows IO operations to be performed in support of the applications. The storage grid and computation nodes may be, but are not necessarily, located within a single chassis. A physical part of the interface 206 may include busses, backplanes and switching fabrics that enable fast and wide data transfer. Consequently, a product associated with the invention could include a fully functional network storage platform in which a buyer can load and remove their own applications.

Figure 3:
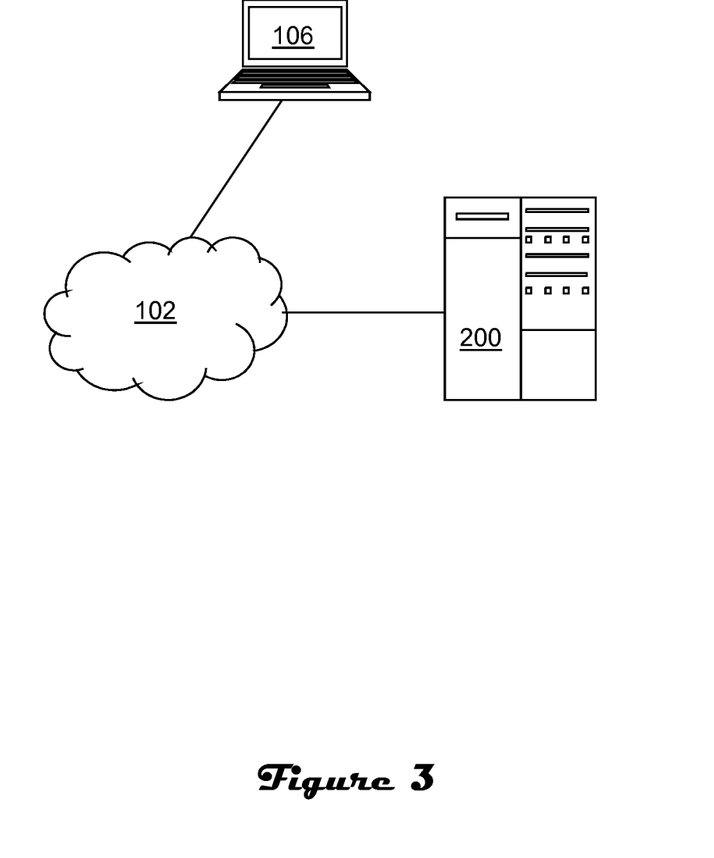
FIG. 3 illustrates a network in which a networked storage platform runs applications to support users.

As shown in FIG. 3, the networked storage platform 200 may obviate the need for servers and other host devices in certain situations. In the illustrated example the user 106 communicates with a computation node of the storage platform via the network 102 directly, rather than through a server. However, it may be desirable to have the computation nodes run applications which require access to the storage grid and have a server run applications which do not require access to the storage grid but are required to support a particular service. Consequently, the latency associated with IO operations performed over the network 102 (FIG. 1) between an application and associated data is mitigated.

Figure 4A:
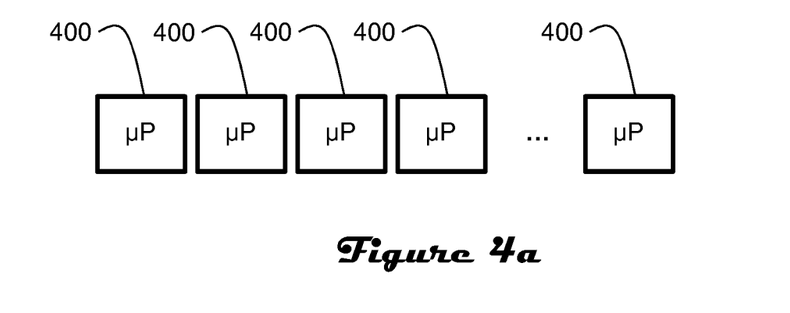
FIGS. 4a and 4b illustrate embodiments of the computation nodes of FIG. 3.
Figure 4B:
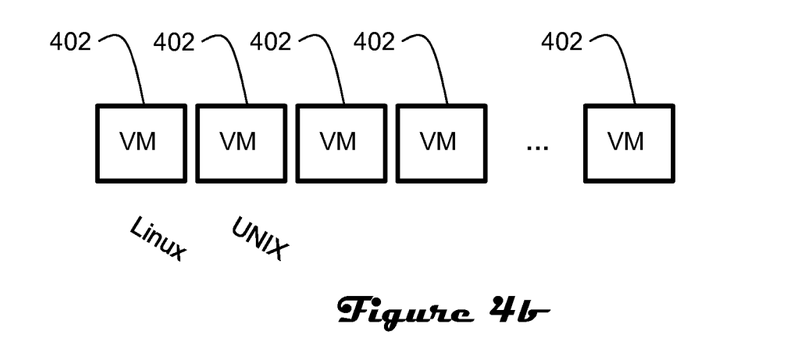

Referring now to FIG. 4a, each computation node may be associated with a separate processor 400 or group of processors, i.e., a separate hardware device or devices. Alternatively, as illustrated in FIG. 4b, each computation node may be associated with a separate virtual machine 402, i.e., a separate virtual device which shares the resources of a hardware device or devices. The hardware devices need not be identical, and may be customized to better support particular applications. Similarly, different types of virtual machines may be provided.

Figure 5:
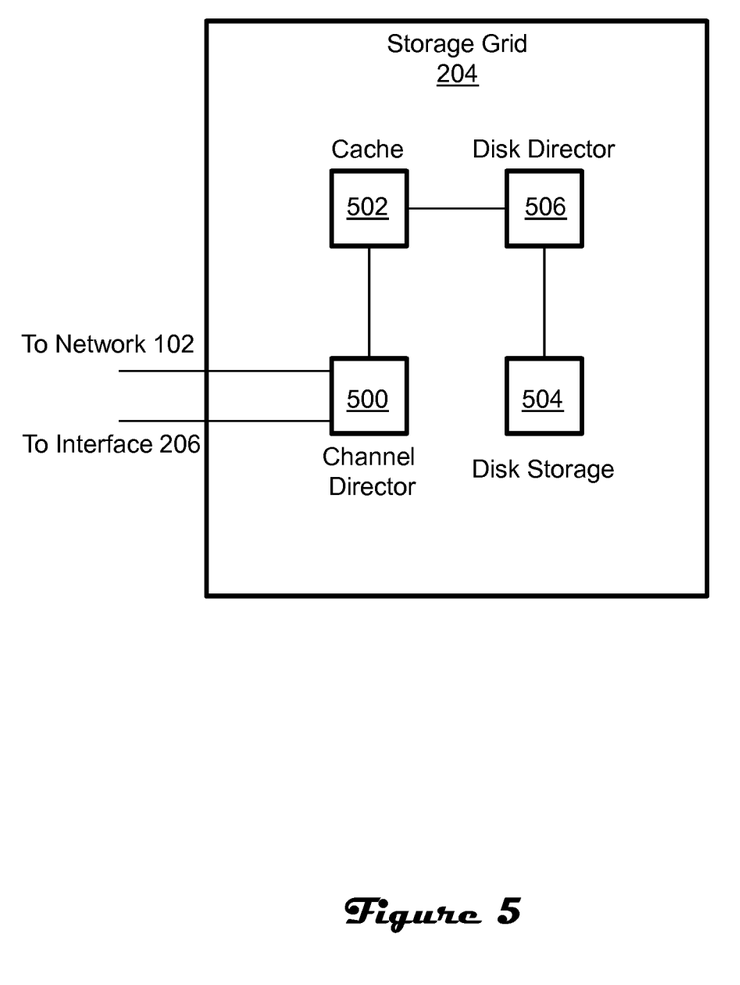
FIG. 5 illustrates an embodiment of the interface of FIG. 2.

FIG. 5 illustrates an embodiment of the storage platform in which the interface provides the computation nodes with access to a channel director 500 of the storage grid 204. Basic IO operations include Read and Write operations. A Read Hit occurs when all data necessary to satisfy an IO request is in cache 502 (global memory). In this case the channel director transfers the requested data from the cache to the computation node via interface 206, or to the user via network 102. A Read Miss occurs when the data necessary to satisfy an IO request is not in the cache 502. In this case the data must be retrieved from disk storage 504 so a disk director 506 reads the blocks containing the data from the disks or other devices associated with disk storage and transfers the data to the cache 502. The channel director 500 then transfers the requested data from the cache to the computation node via interface 206, or to the user via network 102. The computation nodes may communicate with the channel director using a standardized protocol, e.g., SCSI commands, or a non-standardized protocol.

Figure 6:
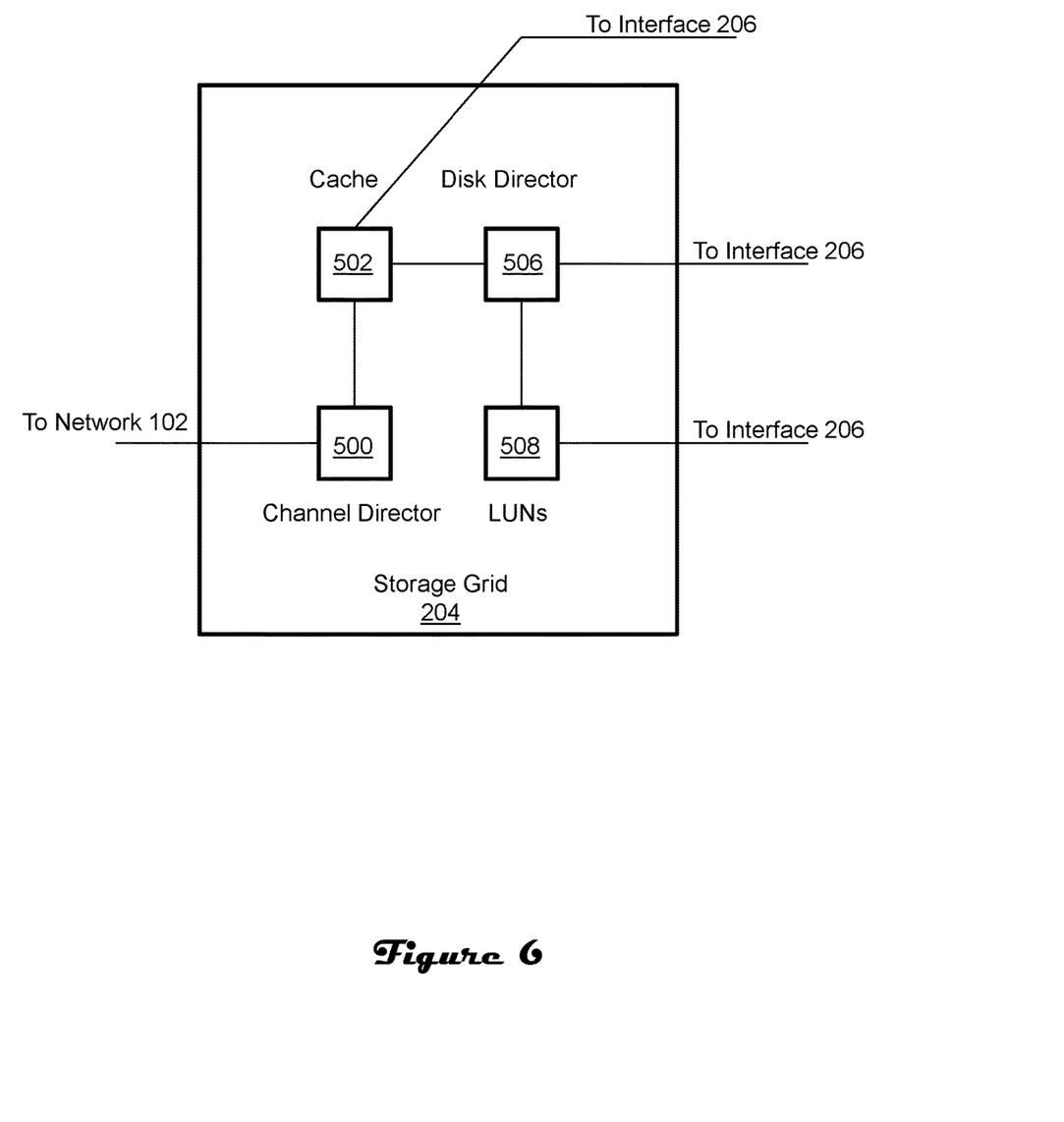
FIG. 6 illustrates an alternative embodiment of the interface of FIG. 2.

FIG. 6 illustrates an alternative embodiment of the storage platform. In this embodiment the computation nodes may utilize the interface 206 to directly communicate with one or more of the cache 502, disk director 506 and LUNs 508, where each LUN is a logical unit number referring to a logical storage device that may be associated with multiple physical devices of disk storage 504 (FIG. 5). The computation nodes may communicate with the cache 502, disk director 506 and LUNs 508 via the interface 206 using a standardized protocol, e.g., SCSI commands, or a non-standardized protocol. In one embodiment the computation nodes can utilize a direct data placement protocol to perform IO operations with better speed than standardized protocols.

Figure 7:
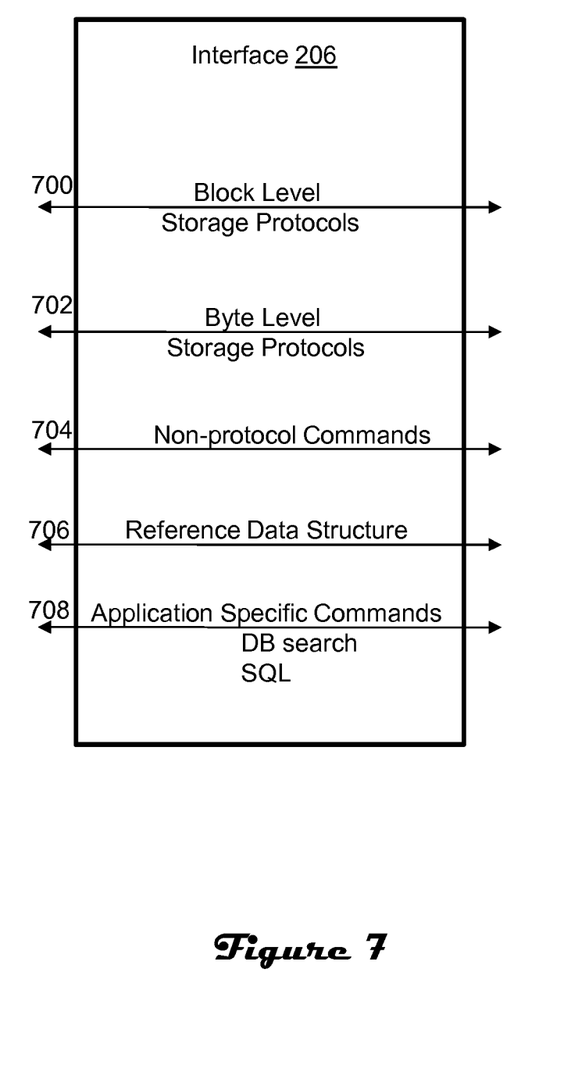
FIG. 7 illustrates the interface in greater detail.

FIG. 7 illustrates aspects of the interface 206. As mentioned above, performance is enhanced by avoiding latency associated with IOs performed across the network. Consequently, the interface may be configured to support block level storage protocols 700 and byte level storage protocols 702 that might otherwise be tunneled over the network. Such embodiments have the advantage of being easily implementable because of the existing infrastructure of applications that are designed to utilize such protocols. However, performance can be further enhanced by removing layers and processing overhead associated with network and storage protocols. For example, the application and storage grid can be tightly integrated via the interface such that non-protocol commands 704 can be utilized. The non-protocol commands can take various forms, including block and byte level commands. Another example is referencing a data structure 706 such as a flat space defined by a range of N bytes addressed 1-N. In this case the application can request the structure, and the interface will respond by providing the corresponding storage. The application can then prompt IOs based on the addresses. The interface translates the addresses into actual locations in the storage array. The interface may also be configured to understand and provide other data structures including but not limited to multi-dimensional arrays. Alternatively, the application may read and write with application specific commands 708 that are native to the application. For example, and without limitation, the interface could respond to database query language commands. In this case the interface may be customized so that the application specific commands can be understood and used to prompt corresponding IOs. The interface and application may also be configured to utilize other features of the storage array. For example, the interface, application, or both can be configured to determine which tier of storage to utilize for particular data. In one embodiment the interface is configured to recognize particular data types such as log files, and automatically store particular types of data in a particular tier of storage. Recognizing data type has the additional advantage that the application can then refer to the data by a type indicator to prompt IOs. In general it will be appreciated that avoiding the "front end" of the storage array can enable performance enhancements.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus comprising:
    a network storage platform comprising:
        a plurality of computation nodes that run instances of a host application that generate requests for application data structures;
        a global cache;
        a plurality of channel directors that receive storage protocol requests via a network and in response retrieve data from the global cache to service the storage protocol requests;
        a plurality of disk directors responsive to the channel directors to copy the data from data storage to the global cache; and
    an interface responsive to the computation nodes to obtain the application data structures from data storage and provide the application data structures to the computation nodes by providing the computation nodes with direct access to the global cache using a direct data placement protocol, and providing the computation nodes with direct access to LUNs, where each LUN is a logical unit number referring to a logical storage device associated with multiple physical storage devices of the data storage.

2. The apparatus of claim 1 wherein the interface supports non-protocol commands.

3. The apparatus of claim 1 wherein the interface recognizes a type of host application data and stores the recognized type of host application data in a preselected tier of the data storage.

4. The apparatus of claim 1 wherein the host application is selectively loaded onto ones of the computation nodes and unloaded from ones of the computation nodes.

5. The apparatus of claim 1 wherein the interface provides the computation nodes with direct access to the channel directors.

6. The apparatus of claim 5 wherein the computation nodes communicate with the channel directors using a standardized protocol.

7. The apparatus of claim 6 wherein the standardized protocol includes SCSI commands.

8. The apparatus of claim 1 wherein the interface provides the computation nodes with direct access to the disk directors.

9. The apparatus of claim 1 wherein the computation nodes communicate with at least one of the global cache, disk directors and LUNs using a direct data placement protocol, where each LUN is a logical unit number referring to a logical storage device associated with multiple physical storage devices.

10. The apparatus of claim 1 wherein each computation node includes a dedicated physical processor.

11. The apparatus of claim 1 wherein each computation node includes a virtual machine.

12. The apparatus of claim 1 wherein the interface supports non-protocol commands which are native to the host application.

13. A method comprising:
in a network storage platform comprising a plurality of computation nodes, a plurality of channel directors, a plurality of disk directors and a global cache:
at least one of the channel directors signaling to at least one of the disk directors in response to storage protocol requests received via a network;
at least one of the disk directors copying requested data from data storage to the global cache in response to the signaling from the at least one of the channel directors to service the storage protocol requests;
running instances of a host application on the computation nodes;
the instances of the host application generating requests for application data structures; and
obtaining the application data structures from data storage in response to the requests from the computation nodes and providing the data structures to the computation nodes by:
directly accessing the global cache by the at least one of the computation nodes using a direct data placement protocol; and
at least one of the computation nodes directly accessing LUNs, where each LUN is a logical unit number referring to a logical storage device associated with multiple physical storage devices of the data storage.

14. The method of claim 13 including an interface between the computation nodes and storage grid, and including processing non-protocol commands with the interface.

15. The method of claim 13 including an interface between the computation nodes and storage grid, and including the interface recognizing a type of host application data and storing the recognized host application data in a preselected tier of the data storage.

16. The method of claim 13 including an interface between the computation nodes and storage grid, and including processing non-protocol commands which are native to the host application with the interface.

17. The method of claim 13 including selectively loading the host application onto ones of the computation nodes and selectively removing the host application from ones of the computation nodes.

18. The method of claim 13 including the computation nodes directly accessing the channel directors.

19. The method of claim 13 including the computation nodes directly accessing the channel directors using a standardized protocol.

20. The method of claim 19 including the computation nodes directly accessing the channel directors using SCSI commands.

21. The method of claim 13 including the computation nodes directly accessing the disk directors.

22. The method of claim 13 including the computation nodes directly accessing at least one of the global cache, disk directors and LUNs using a direct data placement protocol, where each LUN is a logical unit number referring to a logical storage device associated with multiple physical storage devices.

23. The method of claim 13 including running the host application on a dedicated physical processor.

24. The method of claim 13 including running each of the host application instances on a virtual machine.

* * * * *